(12) United States Patent　　(10) Patent No.: US 11,544,293 B2
Sundström　　(45) Date of Patent: Jan. 3, 2023

(54) COMPUTER SYSTEM AND METHOD FOR INDEXING AND RETRIEVAL OF PARTIALLY SPECIFIED TYPE-LESS SEMI-INFINITE INFORMATION

(71) Applicant: Fabulous Inventions AB, Luleå (SE)

(72) Inventor: Mikael Sundström, Luleå (SE)

(73) Assignee: Fabulous Inventions AB, Luleå (SE)

( * ) Notice: Subject to any disclaimer, the term of this patent is extended or adjusted under 35 U.S.C. 154(b) by 10 days.

(21) Appl. No.: 17/044,967

(22) PCT Filed: Apr. 17, 2019

(86) PCT No.: PCT/SE2019/050354
§ 371 (c)(1),
(2) Date: Oct. 2, 2020

(87) PCT Pub. No.: WO2019/203718
PCT Pub. Date: Oct. 24, 2019

(65) Prior Publication Data
US 2021/0165808 A1　Jun. 3, 2021

(30) Foreign Application Priority Data
Apr. 20, 2018　(SE) .................... 1850462-1

(51) Int. Cl.
*G06F 16/00*　(2019.01)
*G06F 16/28*　(2019.01)
(Continued)

(52) U.S. Cl.
CPC ........ *G06F 16/285* (2019.01); *G06F 16/2246* (2019.01); *G06F 16/248* (2019.01);
(Continued)

(58) Field of Classification Search
None
See application file for complete search history.

(56) References Cited

U.S. PATENT DOCUMENTS

2003/0110189 A1* 6/2003 Agrawal ............. G06F 16/2452
707/999.203
2005/0102251 A1　5/2005 Gillespie
(Continued)

FOREIGN PATENT DOCUMENTS

CA　　2 451 208 A1　　1/2003
CN　　105022740 A　　11/2015

OTHER PUBLICATIONS

Author: Roitblat et al., Title: "Ternary Tree Optimization for n-gram Indexing", Date: 2014, Pertinent Pages: Whole document as attached, Publisher: ISBN 978-80-01-05482-6. (Year: 2014).*
(Continued)

*Primary Examiner* — Anhtai V Tran
(74) *Attorney, Agent, or Firm* — Renner, Otto, Boisselle & Sklar, LLP

(57) ABSTRACT

A system (100) for Partial Unstructured Information Processing, constituting storing, indexing, querying and retrieval of partially specified unstructured data, the system (100) comprising: Quantum Clustering Algorithm (101) that partitions data records in different clusters such that the data in each cluster can be indexed efficiently, a Compressed Ternary Tree (111, 112, 113) that replaces all conceivable indices for each cluster thereby solving the Unthinkable Query Problem (110) for each cluster, and a Virtual Query Processor (120) that converts traditional data base queries to raw Compressed Ternary Tree queries and appropriate filters (121, 122, 123).

17 Claims, 2 Drawing Sheets

(51) Int. Cl.
  *G06F 16/22* (2019.01)
  *G06F 16/2453* (2019.01)
  *G06F 16/2455* (2019.01)
  *G06F 16/248* (2019.01)
  *G06K 9/62* (2022.01)

(52) U.S. Cl.
  CPC .. *G06F 16/24542* (2019.01); *G06F 16/24554* (2019.01); *G06K 9/6218* (2013.01)

(56) References Cited

U.S. PATENT DOCUMENTS

| | | |
|---|---|---|
| 2007/0143235 A1 | 6/2007 | Kummamuru et al. |
| 2008/0059512 A1* | 3/2008 | Roitblat .................. G06F 16/35 707/999.102 |
| 2012/0321204 A1 | 12/2012 | Fertik et al. |
| 2015/0310090 A1 | 10/2015 | Doshi |

OTHER PUBLICATIONS

International Search Report and Written Opinion for corresponding International Patent Application No. PCT/SE2019/050354 dated Sep. 6, 2019.

Robenek D; Platas J; Snasel V, "Ternary tree optimalization for n-gram indexing", 14th International Workshop on Current Trends in Databases, Information Retrieval, Algebraic Specification and Object Oriented Programming, Dateso 2014, Published Apr. 16, 2014; abstract; paragraph [0003].

Zhu Chunying; Li Qingzhong; Kong Lanju; Wei Song, "A Combined Index for Mixed Structured and Unstructured Data", 2015 12th Web Information System and Application Conference (WISA), Published Sep. 11, 2015, doi:10.1109/WISA.2015.36; abstract; paragraphs [0003]-[0004].

International Preliminary Report on Patentability for corresponding International Patent Application No. PCT/SE2019/050354 dated Aug. 20, 2020.

* cited by examiner

COMPUTER SYSTEM AND METHOD FOR INDEXING AND RETRIEVAL OF PARTIALLY SPECIFIED TYPE-LESS SEMI-INFINITE INFORMATION

TECHNICAL FIELD

The present disclosure relates to a device, system and method for data base processing of partially specified type-less semi-infinite information.

BACKGROUND

Information- or data stored in a data base (the term data base will be used, throughout this document, in a very general sense to mean any system supporting information storage, search and retrieval) is typically organized in records where each record has one or more fields. Fields can have different types such as text strings, integers, etc., and are typically also associated with field names. The collection of field names and types of records defines the type of the entire record (sometimes only the types of the fields are considered to constitute the type of a record, such as structures and unions in the C programming language, but the intended usage of a type becomes clearer when including field names in record types as well).

In general, records are completely specified. That is, if there are records representing persons, consisting of name, age, and sex, these three fields are typically specified in each record stored in the data base—records where age is unspecified etc. are not present. Typically, it is not possible to store wild cards or partially specified information, e.g. intervals, in fields directly. This requires an extension of the record type where each partially specified field is either associated with an extra Boolean field indicating whether the field is specified or not, e.g. age_is_specified, or represented by two fields constituting an interval, e.g. age_min and age_max.

To support fast retrieval of records, data bases are typically augmented with one or more indices. An index is a separate data structure where the values from one field in all records are used as keys and each key is associated with all records where the value stored in that field of the records is the same as the value of the key. There may be one index per field or fields that are not indexed and there may also be indices where the keys are created by combining values from several fields into tuples.

Different kinds of indices require different kinds of data structures and the types of queries to be supported also impacts the index requirements. For example, if the goal is merely to search for a single age, in the example above, and each record has a specified age value (i.e. not an interval), an array with direct indexing may be used whereas if the goal is to select all records where the age value falls within a certain range it may be better to use another data structure (in this example there is no need though as the size of the universe, i.e. the number of possible values, of age is very small).

There may also be fields, or entire records for that matter, that consist of binary data which may or may not have a structure and where the structure, assuming there is one, may or may not be known or may or may not be considered. Such data is sometimes referred to as Binary Large Objects (BLOB's). BLOBs are typically fully specified, i.e. each bit is either 0 or 1, are typically not indexed.

In traditional data bases, the types of all different kinds of records to be stored in the data base are known when data is inserted into the data base. In addition to record types, some knowledge of which kind of queries to support is also typically available. The data base can therefore be configured in advance by means of a data scheme and it becomes trivial to properly store incoming records as well as to maintain all indices on-the-fly providing an at-all-time query ready data base from start.

This is an excellent approach if both the structure of incoming data as well as which queries to be supported are known beforehand.

However, if the need for a new unthinkable query arrives after populating a traditional data base with trillions of records it may be challenging to build an index from scratch due to the amount of data. Even in-the-event that it is possible to build a new index, it will take time and thus be a long delay, before the index is completed, and the new query can be supported. Building a new index from a large data set is also associated with a high computational cost for going through all the data, which is required to build a new index, and the computational cost for building an index is in the same magnitude as the cost for brute force processing of the query by scanning through all records. This is referred to this as the Unthinkable Query Problem and corresponding processing of unthinkable queries as Unthinkable Query Processing (UQP).

Efficient solutions to the Unthinkable Query Problem are not possible to implement with traditional data bases, due to the high cost of index construction from scratch and or brute force scanning, thus severely impacting the value of data stored in huge traditional data bases. Data Mining/Data Science may either require brute force approaches such as going through all data or new index construction to support special queries for data cleansing etc. which will limit the ability to experiment with the data as the cost for each "What if we look at the data this way?"-experiment will be way too high. Furthermore, since the cost for each such experiment increases with the amount of data available and the possibility to learn more is also higher the more data that is available, the impact of not being able to implement efficient UQP in traditional databases is that the more data that is available the less it is possible to learn for a reasonable computation cost.

At the same time as the amount of available information to analyze increases exponentially there is an increasing demand for dealing with unstructured data. When dealing with unstructured data it may not be known what the data represent when it is gathered- and entered-into the data base. As-a-consequence, learning what the data represents constitute the first steps in working with the data and this can typically be initiated first after a large amount of data is collected. Not knowing what the data represent from start makes it impossible to define record types/data schemes to store the data and thus all incoming data records must therefore be stored as BLOBs.

Furthermore, with large amounts of unstructured data there may be incomplete records (e.g. as result of noise, lack of measurements etc.) and in unstructured data this is represented by wildcard bits meaning that it is not known if the bit is 0 or 1. Each record must therefore be represented by a ternary bit string where each bit either has the value 0, 1 or wildcard (usually denoted by an asterisk *) and consequently each record must therefore be stored as a Ternary Large Object (TLOB). Different TLOB's may represent different pieces of information with different sizes (e.g. DNA molecule vs. registration plate). Furthermore, by allowing wildcards, the information content (i.e. number of non-wildcard bits) of a TLOB can be very small with respect to the effective size (i.e. number of bits) of the TLOB. Therefore, TLOB's are considered to be semi-infinite ternary bit strings for all practical purposes. Semi-infinite ternary bit string means a ternary bit string where the first bit has index zero and the following bits are numbered 1, 2, 3, and so on up to an arbitrarily large index for the last bit. In practice the ternary bit strings processed are limited in size by the application and/or by the memory of the computer running the data base where the processing takes place. The key properties (and challenges) when processing data consisting of semi-infinite ternary bit strings are:

Records may be partially specified (fully specified only if there are no wildcard bits).

Records are constituted by unstructured data and are thus type- and data schema-less.

Records are not possible to index using traditional data bases indexing techniques.

Records may be very large, i.e. hundreds of thousands of ternary bits.

This entire problem space is referred to as the Partially Specified Type-less Semi-infinite Information Problem (PSTLSIIP). Clearly, any solution to PSTLSIIP also solves the Partially Specified Type-less Information Problem (PSTLIP), the Type-less Semi-infinite Information Problem (TLSIIP), and the Type-less Information Problem (TLIP). PSTLSIIP, PSTLIP, TLSIIP and TLIP are referred to collectively as Partial Unstructured Information Processing. As-a-result from the lack of ability to index partial unstructured information any query becomes an unthinkable query and thus Partial Unstructured Information Processing requires a solution to the Unthinkable Query Problem and thus UQP. Furthermore, the more partial and unstructured the data is the more there is to learn from unstructured data and it follows that when using traditional data bases, the more it is necessary need to learn about the data, the less it is possible to learn for a reasonable computation cost.

SUMMARY

Embodiments presented herein advantageously provides Partial Unstructured Information Processing, constituting storage, indexing, querying and retrieval of partially specified unstructured data, featuring a Quantum Clustering Algorithm (QCA) (101) that partitions data records in different clusters, a Compressed Ternary Tree (CTT) (111, 112, 113) that replaces all conceivable indices for each cluster, and a Virtual Query Processor (VQP) (120) that converts queries to raw Compressed Ternary Tree queries and filters (121, 122, 123), among other things.

According to a first aspect, there is provided a system for Partial Unstructured Information Processing (100), constituting storing, indexing, querying and retrieval of partially specified unstructured data, featuring a Quantum Clustering Algorithm (101) that partitions data records in different clusters such that the data in each cluster can be indexed efficiently, a Compressed Ternary Tree (111, 112, 113) that replaces all conceivable indices for each cluster thereby providing Unthinkable Query Processing (110) for each cluster, and a Virtual Query Processor (120) that converts traditional data base queries to raw Compressed Ternary Tree queries and appropriate filters (121, 122, 123).

According to another aspect, there is provided a method (200) for Partial Unstructured Information Processing, constituting storing, indexing, querying and retrieval of partially specified unstructured data, featuring a Quantum Clustering Algorithm (201) that partitions data records in different clusters wherein each cluster is associated with a quantum key, wherein keys, represented by semi-infinite ternary bit strings, that are added (202) to a cluster (210, 220, 230) are attached (212, 222, 232) to the quantum key (211, 221, 231) associated with the cluster and keys that are removed (203) from a cluster are detached (213, 223, 233) from the quantum key (211, 221, 231) associated with the cluster, wherein a new key to be inserted is matched (250) against the quantum key of each existing cluster, wherein the best match is compared (251) to a threshold (252) to determine if the match is sufficiently good, wherein the key to be inserted is added (260) to the cluster with the best matching quantum key if the match is sufficiently good, wherein a new cluster is created (270) followed by adding the key to be inserted to the new cluster (240) if the best match is not sufficiently good, a Compressed Ternary Tree that replaces all conceivable indices for each cluster wherein each cluster is associated with a Compressed Ternary Tree (214, 224, 234, 244), wherein the new key is inserted (280) in the Compressed Ternary Tree of the selected cluster, and a Virtual Query Processor that converts (290) traditional data base queries to raw Compressed Ternary Tree queries (raw query) and appropriate filters, wherein a raw query consists of start, length, pattern and negate, wherein the pattern of a raw query are either a ternary bit strings or a general integer intervals converted (291) to intervals that can be represented using power-of-2-completion, wherein proper set operations such as union and intersection are used to combine (292) results from partitioned queries to produce the result of the original query, wherein intersection pruning (293) is used to increase the speed for executing complex queries.

According to a further aspect there is provided a computer program loadable into a memory communicatively connected or coupled to at least one data processor, comprising software for executing the method according to any of the embodiments presented herein when the program is run on the at least one data processor.

According to yet another aspect there is provided processor-readable medium, having a program recorded thereon, where the program is to make at least one data processor execute the method according to of any of the embodiments presented herein when the program is loaded into the at least one data processor.

BRIEF DESCRIPTION OF THE DRAWINGS

The invention is now to be explained more closely by means of preferred embodiments, which are disclosed as examples, and with reference to the attached drawings.

DETAILED DESCRIPTION

Introduction

Figure 1:
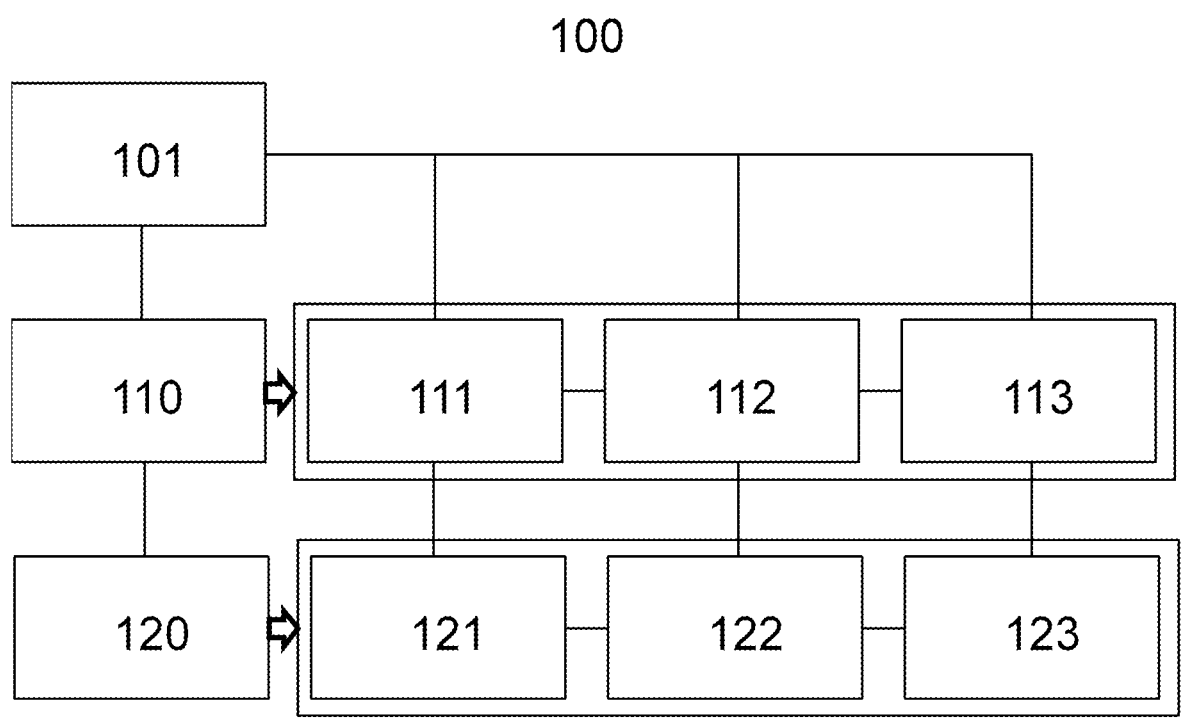
FIG. 1 shows a schematic overview of a system according to one or more embodiments.
Figure 2:
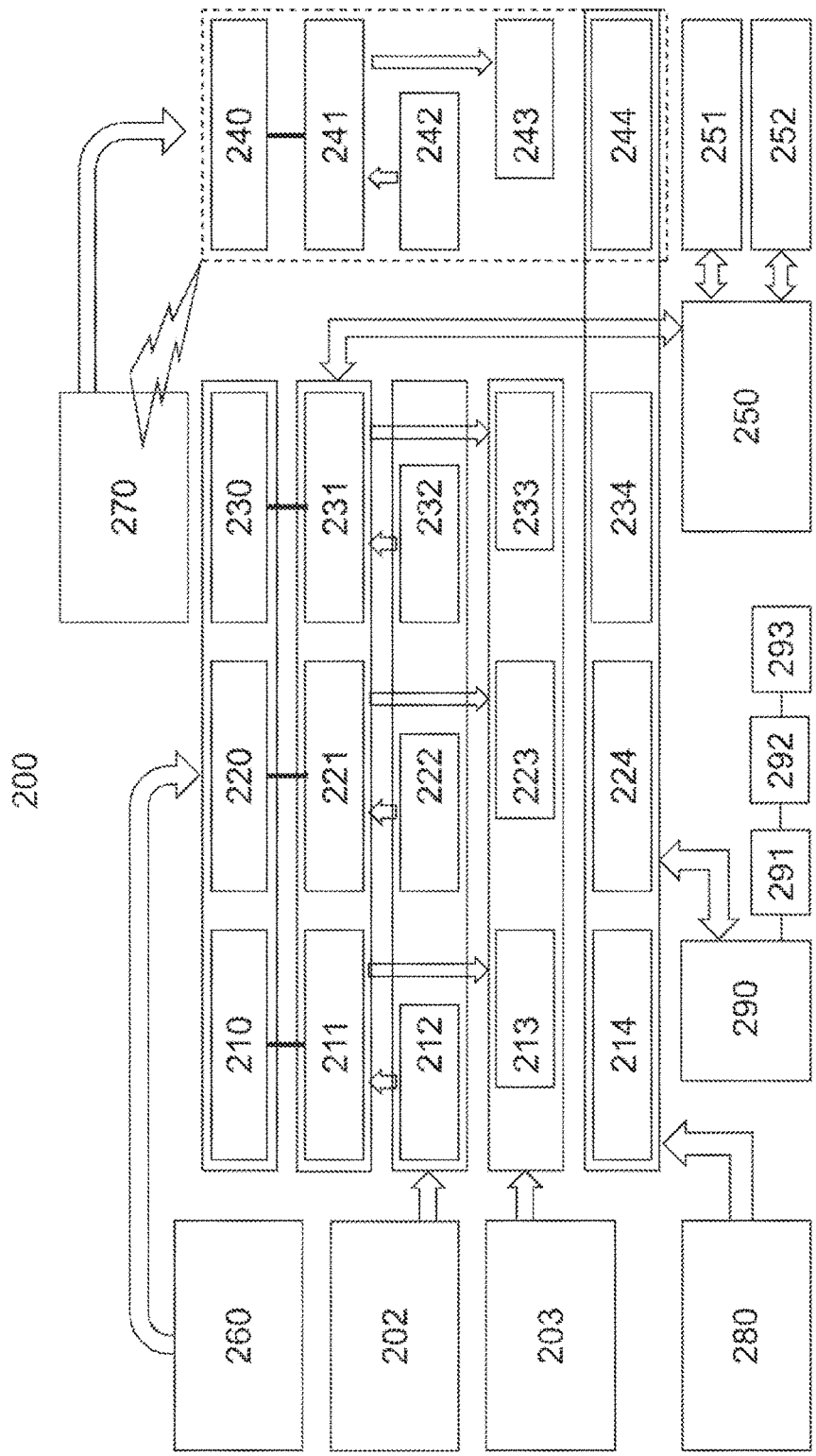
FIG. 2 is a flow chart of a method according to one or more embodiments.

The present disclosure describes a system and method for Partial Unstructured Information Processing, constituting storing, indexing, querying and retrieval of partially specified unstructured data, featuring a Quantum Clustering Algorithm (101) that partitions data records in different clusters such that the data in each cluster can be indexed efficiently, a Compressed Ternary Tree (111, 112, 113) that replaces all conceivable indices for each cluster thereby providing Unthinkable Query Processing (110) for each cluster, and a Virtual Query Processor (120) that converts traditional data base queries to raw Compressed Ternary Tree queries and appropriate filters (121, 122, 123).

An example of a problem that can be mitigated using embodiments presented herein is the problem of efficiently processing partially specified unstructured information in a data base, including processing of unthinkable queries.

Embodiments of the present disclosure provide a Quantum Clustering Algorithm (101), a Compressed Ternary Tree (111, 112, 113), and a Virtual Query Processor (120) combined to provide a system and method for Partial Unstructured Information Processing.

In what follows there is provided a brief description of the three core components of the invention.

A data record consisting of a semi-infinite TLOB is referred to as a key. The invention is completely agnostic with regards to the underlying key representation, i.e. how keys are represented and stored in the computer, and only requires the following operations on keys to be supported:
Create key
  Create a new key with all bits set to wildcard.
Get bit from key
  Read the value (0, 1 or *) of a bit with a given index i≥0 from the key
Set bit in key
  Write the value (0, 1, or *) to a bit with a given index i≥0 in the key.

The invention as such does not impose any restriction on the maximum length, i.e. maximum bit index plus one, of a key but for practical reasons the index can size can be limited to the number of values that can be stored in a word in the computer. In some embodiments, tailored to address specific applications, the maximum size a key can be quite limited (e.g. packet classification in a computer network using 384-bit keys). Besides the necessary operations on keys mentioned above, it is also practical to be able to destroy keys and reclaim allocated memory (if automated garbage collection is not available) as well as to clone keys.

In addition to the underlying key representation, the invention is also agnostic with regards to how keys are stored. The storage location can be a file on disk, an array in main memory, a key-value-store data base (where the key is associated with a handle) or something else. In some embodiments, keys are organized in an array of slots 0, 1, 2, 3, . . . where the key stored in a slot with lower number has higher priority. The purpose of this is to support lookup of the key with highest priority rather than all matching keys. A person skilled in the art will be able to implement other schemes to support lookup of the key with highest priority.

The purpose of the Quantum Clustering Algorithm (101) is to partition the set of keys in clusters (210, 220, 230, 240) such that keys of each cluster can be efficiently represented by a Compressed Ternary Tree (111, 112, 113, 214, 224, 234, 244). The detailed description provides a more thorough description of what this means exactly but for now it is sufficient to disclose that it relates to how easy it is to distinguish keys from each other (keys that are easy to distinguish from each other should be in the same cluster and keys that are hard to distinguish from each other should be in different clusters).

After the new key is stored in the storage location, the key is matched (250) with each existing cluster to determine if there is one-or-more (preferably only one) cluster with sufficiently good match (251, 252) in which case that cluster is selected (260) (or the best matching cluster if there is a sufficiently good match with several clusters) followed by inserting the key in the selected cluster. If no cluster with sufficiently good match exist, a new empty cluster is created (270), and the new key will be the first key inserted in that new cluster. Each cluster is associated with a quantum key (211, 221, 231, 241) that represents the combined set of keys that belong to the cluster. The match (250) between a key and a cluster is computed by matching the key with the quantum key (211, 221, 231, 241), for that cluster, to obtain a real number value between zero and infinity, where lower number means better match (this is described in detail below).

After selecting cluster, the key is inserted into the, possibly empty, Compressed Ternary Tree (214, 224, 234, 244) associated with the cluster followed by attaching (212, 222, 232, 242) the key to the quantum key (211, 221, 231, 241).

To simplify deletion, a reference to the cluster where an inserted key is located is recorded. Deletion is then achieved by simply detaching (213, 223, 233, 243) the key from the quantum key of the cluster and removing the key from the Compressed Ternary Tree (214, 224, 234, 244) associated with the cluster.

For clarity, when discussing lookup, the key to lookup is referred to as the query key and the keys stored in the data base as table keys. The purpose of lookup is to find the set of all table keys that matches a query key. The set of matching table keys is referred to as the result of the lookup. This lookup operation corresponds to a select operation in a traditional data base.

Raw Compressed ternary Tree queries are executed by looking up the query key. Lookup of a query key is achieved by looking up the query key in the Compressed Ternary Tree for each cluster and accumulating the result. There are various ways to accumulate the result. In some embodiments, the result is accumulated in a linked list of matching keys and in other embodiments the result is represented by set bits in a bit mask that represent all possible slots and where each slot is associated with a bit location (bit set means match). Other representations are also possible. In fact, any representation suitable for representing a set of entities can be used to represent the result from lookup.

A query key is represented in the same way as a table key and must support the same set of operations. This allows for considerable generality when crafting data base queries.

Example: Consider a large set of table keys where it is suspected that, in some of these keys, the bits starting with index 32 and six bytes forward represents Swedish license plates in ASCII ("CONDITION"). Swedish license plates (except so called "vanity plates") have the format <A-Z><A-Z><A-Z><0-9><0-9><0-9> (assuming only capitals and with some exceptions where the three-letter combination result in profanity). The ASCII code for A, Z, 0, and 9 are 65, 90, 48 and 57, respectively, and the corresponding binary representations are 01000001, 01011010, 00110000, and 00111001, respectively. Observing that the binary representation of all letters is of the form 010*** and the representation of all digits are of the form 0011 (some stray characters that are neither letters nor digits also match these two patterns). To filter out table keys satisfying CONDITION it suffices to craft a query key where key bits 32** and forward are
010***010*010*00110011**
0011****
(all other bits are wildcard) followed by looking up the query key. The resulting table keys may satisfy CONDITION but are not guaranteed to as there are stray characters matching but the table keys that are not part of result are guaranteed not to satisfy CONDITION.

In the example above, a query key is crafted manually to specifically filter out table keys with respect to a given criteria. This is the role of the Virtual Query Processor (120). It converts traditional data base queries such as "select entries where age>15" to a sequence of Compressed Ternary Tree queries and a function for converting the results into a single result.

Example: Assume that age is an 5-bit field starting at bit index 128. Then the expression ">15" corresponds to binary numbers where bit 4 is set. Hence, the corresponding Compressed Ternary Tree query key will only have bit 132 set to 1 and all other wildcards.

In many cases it is not possible to represent a traditional query with a single Compressed Ternary Tree query. In the example above, the interval is easily represented by specifying only a single bit. Intervals in general must be represented as a union of several patterns.

Example: Let the key consist only of 4 bits and consider the query "select entries where 0<key<6". In this case, the bit patterns matching the query are 0001, 0010, 0011, 0100, and 0101. To match these, and only these, bit patterns three queries Q1=0001, Q2=001*, and Q3=010* are needed, and the original query is executed by looking up each of Q1, Q2, and Q3 and computing the union (i.e. set union) of the results. That is if Ri=lookup(Qi), then "select entries where 0<key<6"=R1+R2+R3, Where "+" denotes set union.

This concludes the brief description of the invention.

System Architecture

Below, embodiments of the inventive system are described in more detail, with reference to FIG. 1.

The purpose of Quantum Clustering Algorithm (101) is to partition the keys in clusters such that keys of each cluster can be efficiently represented by a Compressed Ternary Tree (111, 112, 113, 214, 224, 234, 244). This is achieved by maintaining a quantum key that combines all keys of each cluster. A quantum key is an array of quantum bits each represented by two counters $n_0$ and $n_1$. There is one quantum bit for each bit index in keys so in essence a quantum key is a semi-infinite array of quantum bits. A quantum key also consists of a counter n used to keep track of how many keys that are attached to the quantum key.

A quantum key of an empty cluster is referred to as an empty quantum key and $n_0=n_1=0$ for all bits and n=0.

When adding a new key to a cluster it is attached (212, 222, 232, 242) to the corresponding quantum key (211, 221, 231, 241). This is achieved by going through all bits of the key and for each bit equal to 0 counter $n_0$ of the corresponding quantum bit is increased by one and for each bit equal to 1 counter $n_1$ of the corresponding quantum bit is increased by one—wildcard bits are ignored. Attachment is concluded by increasing n by one.

When a key is removed from a cluster it is detached (213, 223, 233, 243) from the corresponding quantum key (211, 221, 231, 241). This is achieved in the same way as when attaching a key except that counters are decreased by one rather than increased by one for each non-wildcard bit if the key. Detachment is concluded by decreasing n by one.

Matching (250) a query key K, consisting of ternary bits K. bit[0], K. bit[1], . . . , with a quantum key Q, consisting of quantum bits Q. qbit[0], Q. qbit[1], . . . , is achieved as follows. First a counter N is set to Q. n if K is not attached to Q and Q. n−1 if K is not attached to Q followed by initialization of a variable $z_{acc}=0$. This is followed by going through all bits of the query key. For each bit K. bit[i]=0, $z_{acc}$ is increased by Q. qbit[i]. $n_1$/N and for each bit K. bit[i]=1, $z_{acc}$ is increased by Q. qbit[i]. $n_0$/N. After going through all bits, the result from matching K with Q is computed as $1/z_{acc}$.

As mentioned above, the cluster with the best match between the quantum key and the query key is chosen is the match is good enough. There is however an exception to this. If there is a cluster containing a key identical, i.e. not only matching but truly identical, to the query key that cluster is chosen even without matching against the quantum key. Good enough means that the result from match is less than or equal to a configurable threshold value match threshold.

At regular intervals table keys are inspected to determine if they still belong to the best cluster. These inspections are necessary since clusters evolve and the cluster with a good match when the key was inserted may have changed, due to repeated insertions, resulting in a bad match. If there is another cluster with a better match, the key is removed and added to that cluster instead. If there is no cluster with sufficiently good match the key is inserted into a new cluster. This kind of inspection and re-clustering is part of the maintenance of the data base.

Each cluster is associated with a Compressed Ternary Tree (111, 112, 113, 214, 224, 234, 244) containing the keys.

In what follows is a description of Compressed Ternary Trees in general as well as Compressed Ternary Trees with certain properties, that distinguish them from Compressed Ternary Trees in general. A Compressed Ternary Tree having a certain <property> is usually referred to by <property> CTT to distinguish it from a Compressed Ternary Tree in general.

In the simplest embodiment a basic Compressed Ternary Tree (basic CTT) is used. A basic CTT is recursively defined as follows. It is either empty, a leaf, or a node. A leaf consists of a list of keys and a node consists of three children $child_0$, $child_1$, $child_*$, which are all trees, referred to as subtrees, and unsigned integer index. For each node and non-empty child of the node the node is referred to as the parent of the child. The node at the top of the Compressed Ternary Tree which does not have a parent (or has an empty parent) is called the root.

The key operation of a Compressed Ternary Tree is discrimination which is the process of analyzing a set of keys and finding a bit indices where the bit with said index in some of the keys are 0, in some of the keys 1, and in some of the keys *, thereby obtaining a partition of the original set of keys into a 0-set, a 1-set, and a *-set. Different bit indices yield different partitions and the goal is to find the best bit index. There are different ways to optimize this but, in general, the 0-set and 1-set should be roughly equally large while keeping the *-set as small as possible. If it is not possible to find a bit index such that neither of the 0-set nor the 1-set is empty, discrimination failed.

Insertion of a new key in a basic CTT is achieved as follows. If the tree is empty, a new leaf containing the key is created. If the tree is a leaf, and the new- and existing keys can be discriminated, a new empty (i.e. its children are empty) node with the discriminating bit index is created and the new key as well as the keys stored in the leaf are recursively inserted into the node. If discrimination failed the new key is inserted in the leaf. If the tree is a node, the bit of the new key with the same bit index as the index stored in the node, the pivot bit, is inspected. If the pivot bit is 0 the key is recursively inserted in $child_0$, if the bit is 1 the key is recursively inserted in $child_1$, and if the bit is * the key is recursively inserted in $child_*$. The list of keys stored in the leaves of a basic CTT is treated as a set with no order between the keys and consequently a basic CTT may not contain identical keys, i.e. pairs of keys $K_1$ and $K_2$ such that $\forall i$: $K_1.\text{bit}[i]=K_2.\text{bit}[i]$.

In an alternative embodiment ordered Compressed Ternary Tree (ordered CTT) is used. An ordered CTT identical to a basic CTT except that keys are ordered by priority in each leaf. Priority can be a slot number, memory address, time stamp, real number, or something else which is unique, so that ties can be broken, for each key. An ordered CTT may contain identical keys since they can be distinguished from each other by the priority.

In yet another embodiment a lazy Compressed Ternary Tree (lazy CTT) is used. In a lazy CTT, the discrimination attempt when inserting a key in a leaf is postponed until some point later in time (e.g. before the first lookup) to achieve lower amortized cost for updating the tree at the expense of higher costs for rebuilding larger portions if the tree.

In yet another embodiment a replicating Compressed Ternary Tree (replicating CTT) is used. In a replicating CTT, the child$_*$ of selected nodes are locked, effectively turning such nodes into binary nodes rather than ternary nodes, and keys where the pivot bit is * are inserted in both child$_0$ and child$_1$ of such nodes. The criteria for selecting which nodes that are locked and turned into binary nodes can be based on different metrics such as:

The depth of the tree defined as
   zero for the root node/leaf and
   depth of parent node plus one for other nodes/leaves.

The height of the tree defined as
   zero if the tree is empty,
   number of keys stored if the tree is a leaf, and
   one plus the maximum height of any of the subtrees if the tree is a node.

The cost of the tree defined as
   zero if the tree is empty,
   number of keys stored if the tree is a leaf, and
   one plus cost of child$_*$ plus maximum of cost of child$_0$ and cost of child$_1$ if the tree is a node.

The density of the tree defined as
   zero if the tree is empty,
   number of keys stored if the tree is a leaf, and
   the sum of densities of the subtrees minus the number of keys that are replicated at the node (i.e. stored in both sub-trees) if the tree is a node.

The weight of a tree defined as
   zero if the tree is empty,
   number of keys stored if the tree is a leaf, and
   the sum of weights of the subtrees if the tree is a node.

The frequency of a tree defined as the number of times the root of the tree has been visited during lookup and update operations.

Note that density and weight are equivalent for a non-replicating CTT.

The memory of a computer is organized in a hierarchy with several levels where the access speed decreases as the size increases with increasing level. For example, there may be a level 1 cache which is very fast, very small, and integrated in the microprocessor, a level 2 cache being a slightly slower and larger, level 3 being the main DRAM memory and level 4 being an SSD disk, and level 5 being a huge and slow spin disk. Between each pair of levels, there is a certain amount of level specific data, referred to as the block size of the higher of the two levels, that can be retrieved in unit access cost, i.e. the time it takes to access the data from a level and copy it to the previous level (e.g. from level 5 to level 4). Unit cost means that the cost for accessing the second, third, fourth, and so on, byte is practically zero once the first byte has been accessed if the following accesses takes place reasonably close in time after the first byte has been accessed. The block size between different levels can be quite different and are typically increases with increasing level and memory size on the level. If an application use only a small amount of data, all data may fit in the first three levels and the number of blocks that has to be retrieved from level 3 determines to a high extent the total time required for the computation (total time roughly equals number of blocks retrieved times time required for retrieving one block) whereas the running time for an application that use huge amounts of data may be determined by the number of blocks that has to be fetched from level 5 to level 4. Depending on the application, amount of data, expected data access pattern and the properties of the memory hierarchy (total size, block size, and access cost) there is an optimal block size which means that if data can be organized such that the number of retrievals of blocks of optimal block size is minimized the total time for the computation is also minimized. Determining optimal block size is a straight forward optimization problem and not really part of the invention. As a rule-of-thumb the microprocessor cache line size (512-bit for Intel microprocessors) should be used if most data fits in- and memory accesses takes place in main memory whereas a larger block size related to disk block size should be considered if there are huge amounts of data. Note also that applications where data must be retrieved from another machine using data communication is becoming more and more common. In such cases, properties of the data network as well as server characteristics must be considered when determining the optimal block size.

In yet another embodiment a packed Compressed Ternary Tree (packed CTT) is used. In a packed CTT, the nodes, and to some extent also the leaves, are organized in memory to achieve maximum locality of memory accesses during lookup. This is achieved by recursively relocating nodes and their descendants to memory blocks of optimal block size. This process is referred to as packing. Packing is performed recursively top-down in rounds. A round starts with a subtree and an empty target memory block of optimal size. The root of the subtree is then added to an empty set of candidates for relocation to the target memory block. From the set of candidates, the best candidate (discussed below) is then repeatedly selected and relocated to the target memory block. If the relocated candidate is a node its non-empty children are added to the set of candidates. This is repeated until the round is completed, which occurs either when the target memory block becomes full or when the set of candidates becomes empty, whichever happens first. If the set of candidates is non-empty at the end of a round, a new packing round is performed recursively for each of the subtrees represented by the set of candidates as roots.

There are several ways to select the best candidate for relocation but before discussing this, a detailed description of how Compressed Ternary Tree lookup is performed is provided. Lookup in the whole data base is performed by performing lookup in the Compressed Ternary Tree of each cluster and computing the set union of the results. Lookup in one Compressed Ternary Tree starts with at the root and is performed recursively. If the tree is empty, lookup returns the empty set $\emptyset$. If the tree is a leaf, the query key is compared against each of the table keys stored in the leaf and the set of matching table keys is returned. A pair of compared keys matches if and only if $\forall i$: $K_1.\text{bit}[i]=K_2.\text{bit}[i]+K_1.\text{bit}[i]=*+K_2.\text{bit}[i]=*$, where + denoted logical "or". If the tree is a node, the pivot bit of the key is inspected. If the pivot bit is 0, lookup is performed recursively in child$_0$ and child$_*$ and the result is the set union of the two lookups. If the pivot bit is 1, lookup is performed recursively in child$_1$ and child$_*$ and the result is the set union of the two lookups. If the pivot bit is *, lookup is performed recursively in all three children and the result from lookup is the set union of the three lookups.

When choosing the best candidate for relocation during packing the goal is to minimize the number of memory blocks accessed for lookup. Therefore, it makes sense to either choose the candidate with largest cost or height (see description of metrics in the description of replicating CTT above). If lookups are highly targeted towards a limited set of keys and this is expected to continue it makes sense to consider the frequency to make it cheaper to traverse paths to leaves which are more commonly traversed. In general, the criteria for best candidate selection should be chosen with the application in mind and should also consider any information or prediction about access patterns. As with the problem of determining optimal block size, this is also a straight forward optimization problem where the optimal solution can be a function that combines all available metrics and statistics as well as usage scenarios. It is also possible to change the strategy for candidate selection on-the-fly either manually or automated with- or without the help of arbitrary powerful AI-powered decision support systems.

In yet another embodiment, a compressed Compressed Ternary Tree (compressed CTT) is used. A compressed CTT is a packed CTT where the nodes stored in the same memory blocked are further compressed using various techniques. The most straight forward technique exploits the fact that a reference to another node stored in the same memory block can be represented using considerable fewer bits than a reference to a node stored in an arbitrary memory location. This is referred to as pointer compression. Another technique to obtain a compressed CTT is to encode the structure of the tree stored within the memory block using only a few bits per node. This is referred to as structure compression. Yet another technique to implement a compressed CTT is to use a catalogue of templates that represent certain tree structures and then use a template identifier to record which template is used. This is referred to as template compression. The compression techniques described are merely examples and are not intended to limit the scope of the invention. A person skilled in the art is-able-to combine two or more of the compression techniques described to obtain new hybrid compression techniques that captures the spirit of the invention.

The role of the Virtual Query Processor (120) is to support conversion (290) of traditional data base queries to sequences of raw Compressed Ternary Tree queries and operations (291, 292, 293) on the results of these queries. Whereas a traditional data base query addresses fields of records, the present invention addresses type-less TLOB's. In the absence of well-defined fields, queries must instead address specific bit indexes. A Virtual Query Processor query consist of the following:
  start which is the bit index where the query starts,
  length which is the number of bits addressed by the query, and
  pattern which is a pattern to match.
  negate which is a Boolean that changes match to mismatch and vice versa.
There are two different kinds of patterns:
  ternary bit mask and
  integer intervals.

Both kinds of patterns can represent integer exact match queries.
  Example: Suppose that it is known that there is an 5-bit field, starting at bit 72, in the key that represent age and the goal is to select all keys where age>15. The Virtual Query Processor query to achieve this is written as "select start=72, length=5, pattern=ternary(1***), negate=FALSE".
  Some alternative ways of writing an equivalent query are "select start=72, length=5, pattern=interval(16, ∞), negate=FALSE" and "select start=72, length=5, pattern=interval(0, 15), negate=TRUE".

Ternary patterns do not need to be converted and neither do exact number patterns. Intervals however typically needs to be converted to ternary patterns before performing lookup (the above example being an exception though). This is achieved by computing a minimal set of ternary patterns such that any number in the interval specified matches at least one of the ternary patterns. This conversion is sometimes referred to as power-of-2-completion. The number of ternary patterns required to represent an interval is in the worst case proportional to the base 2 logarithm of the size of the interval. An example of an interval that is particularly troublesome is 0<x<255. This interval must be partitioned into the intervals $1 \leq x \leq 1$, $2 \leq x \leq 3$, $4 \leq x \leq 7$, $8 \leq x \leq 15$, and so on. When intervals are partitioned a single query is turned into a sequence of queries. The Virtual Query Processor (120) is responsible for executing such queries and applying proper set operators on the results to obtain the result expected from the original query. In this example, the result is the set union of the results from the individual queries in the partition. The more queries in a partition, the longer it will take to process the original query. In this case, it would have been better to convert the original query is 0<x<255 to two queries x≠0 and x≠255 (the query is addressed towards an 8-bit field). Using this conversion, the result of the original query is computed as the set intersection of the results of the two queries. That is, only the keys that matches both queries should be selected. When computing intersection between results from queries the Compressed Ternary Tree nodes can be tagged during traversal when looking up the first query to speed up the Compressed Ternary Tree lookups of the second query by skipping traversal into subtrees that are not tagged. Visited nodes are again tagged during the lookup for the second query to further speed up the third query and so on. This method of tagging effectively prunes the search space and improves the query execution speed tremendously for intersection queries and is referred to as intersection pruning.

Although specific embodiments have been described herein for purposes of exemplification, it is understood by those of ordinary skill in the art that the specific embodiments described may be substituted for a wide variety of implementations without departing from the scope of the present invention. Those of ordinary skill in the art will readily appreciate that the present invention could be implemented in a wide variety of embodiments, including hardware and software implementations, or combinations thereof. This disclosure is intended to cover any embodiment defined by the wording of the appended claims.

The invention claimed is:

1. A non-transitory memory communicatively connected or coupled to at least one data processor and having a computer program loaded therein, comprising software for executing a method for Partial Unstructured Information Processing, constituting storing, indexing, querying and retrieval of partially specified unstructured data when the program is run on the at least one data processor, the method comprising: a Quantum Clustering Algorithm that partitions data records in different clusters wherein the data records in each cluster are semi-infinite ternary bit strings, wherein the data records represent keys, wherein a quantum key associated with each cluster combines all keys of each cluster, wherein a new key is inserted in a selected cluster based, at least in part, on a best match between the new key and the quantum key of each existing cluster and a threshold being met, a Compressed Ternary Tree associated with each cluster that replaces all conceivable indices for each cluster wherein the new key is inserted in the Compressed Ternary Tree of the selected cluster, and a Virtual Query Processor that converts traditional data base queries to raw Compressed Ternary Tree queries and filters, wherein proper set operations are used to combine results from partitioned queries to produce the result of the original query.

2. A method for Partial Unstructured Information Processing, constituting storing, indexing and retrieval of partially specified unstructured data, the method comprising: a Quantum Clustering Algorithm that partitions data records in different clusters wherein each cluster is associated with a quantum key, wherein keys, represented by semi-infinite ternary bit strings, that are added to a cluster are attached to the quantum key associated with the cluster and keys that are removed from a cluster are detached from the quantum key associated with the cluster, wherein a new key to be inserted is matched against the quantum key of each existing cluster, wherein the best match is compared to a threshold to determine if the match meets the threshold, wherein the key to be inserted is added to the cluster with a best matching quantum key if the match meets the threshold, wherein a new cluster is created followed by adding the key to be inserted to the new cluster if the best match does not meet the threshold and a Compressed Ternary Tree that replaces all conceivable indices for each cluster wherein each cluster is associated with a Compressed Ternary Tree, wherein the new key is inserted in the Compressed Ternary Tree of the selected cluster.

3. The method according to claim 2, further comprising a Virtual Query Processor that converts traditional data base queries to raw Compressed Ternary Tree queries (raw query) and filters, wherein a raw query consists of start, length, pattern and negate, wherein the pattern of a raw query are either a ternary bit strings or a general integer intervals converted to intervals that can be represented using power-of-2-completion, wherein proper set operations are used to combine results from partitioned queries to produce the result of the original query, wherein intersection pruning is used to increase the speed for executing complex queries.

4. The method of claim 2, further comprising basic, ordered, lazy or replicating Compressed Ternary Trees.

5. The method according to claim 4 wherein the criteria for selecting which nodes to lock in a replicating Compressed Ternary Tree is based on available metrics including depth, height, cost, density, weight, and frequency.

6. The method according to claim 2, further comprising packed Compressed Ternary Trees.

7. The method according to claim 6 wherein candidate selection in each packed Compressed Ternary Tree is based on available metrics including depth, height, cost, density, weight, and frequency.

8. The method according to claim 2, further comprising compressed Compressed Ternary Trees.

9. The method according to claim 8 wherein compression in a compressed Compressed Ternary Tree is achieved by pointer compression, structure compression or template compression.

10. The method according to claim 2 further comprising lookup of a query key by looking up the query key in the Compressed Ternary Tree of each cluster and computing the set union of the results.

11. The method according to claim 3 comprising Virtual Query Processor queries consisting of start, length, pattern and negate.

12. The method according to claim 11 wherein the pattern of a Virtual Query Processor query is either a ternary bit string or an integer interval.

13. The method according to claim 12 wherein power-of-2-completion is used to partition general integer intervals to intervals that can be represented by ternary bit strings.

14. The method according to claim 3 wherein proper set operations including union and intersection operations are used to combine results from partitioned queries to produce the result of the original query.

15. The method according to claim 3 wherein intersection pruning is used to increase the speed for executing complex queries.

16. A non-transitory memory communicatively connected or coupled to at least one data processor and having a computer program loaded therein, comprising software for executing a method for Partial Unstructured Information Processing, constituting storing, indexing and retrieval of partially specified unstructured data when the program is run on the at least one data processor, the method comprising:
   a Quantum Clustering Algorithm that partitions data records in different clusters wherein each cluster is associated with a quantum key, wherein keys, represented by semi-infinite ternary bit strings, that are added to a cluster are attached to the quantum key associated with the cluster and keys that are removed from a cluster are detached from the quantum key associated with the cluster, wherein a new key to be inserted is matched against the quantum key of each existing cluster, wherein the best match is compared to a threshold to determine if the match meets the threshold, wherein the key to be inserted is added to the cluster with a best matching quantum key if the match is meets the threshold, wherein a new cluster is created followed by adding the key to be inserted to the new cluster if the best match does not meet the threshold and a Compressed Ternary Tree that replaces all conceivable indices for each cluster wherein each cluster is associated with a Compressed Ternary Tree, wherein the new key is inserted in the Compressed Ternary Tree of the selected cluster.

17. A processor-readable non-transitory medium, having a program recorded thereon, where the program is to make at least one data processor execute a method for Partial Unstructured Information Processing, constituting storing, indexing and retrieval of partially specified unstructured data when the program is loaded into the at least one data processor, the method comprising:
   a Quantum Clustering Algorithm that partitions data records in different clusters wherein each cluster is associated with a quantum key, wherein keys, represented by semi-infinite ternary bit strings, that are added to a cluster are attached to the quantum key associated with the cluster and keys that are removed from a cluster are detached from the quantum key associated with the cluster, wherein a new key to be inserted is matched against the quantum key of each existing cluster, wherein the best match is compared to a threshold to determine if the match meets the threshold, wherein the key to be inserted is added to the cluster with a best matching quantum key if the match meets the threshold, wherein a new cluster is created followed by adding the key to be inserted to the new cluster if the best match does not meet the threshold and a Compressed Ternary Tree that replaces all conceivable indices for each cluster wherein each cluster is associated with a Compressed Ternary Tree, wherein the new key is inserted in the Compressed Ternary Tree of the selected cluster.

* * * * *